United States Patent Office 2,894,871
Patented July 14, 1959

2,894,871

ALKYL HYDRAZONES OF CYCLOHEXIMIDE

Maxton F. Murray, Kalamazoo Township, Kalamazoo County, Mich., assignor to The Upjohn Company, Kalamazoo, Mich., a corporation of Michigan No Drawing. Application April 4, 1957
Serial No. 650,580

14 Claims. (Cl. 167—33)

This invention relates to novel compositions of matter and to novel processes. More particularly, it relates to lower-alkylhydrazones of cycloheximide, to a process for preparing them, and to their use for preventing and arresting the infestations of fungi, insects, and other pestiferous organisms which are economically harmful to man.

The novel compounds of this invention can be represented by the following general structural formula:

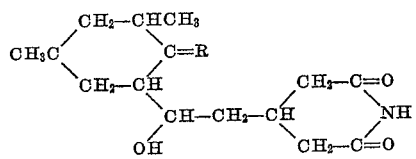

wherein R is a lower-alkylhydrazono group.

Cycloheximide, 3-[2-(3,5-dimethyl-2-oxocyclohexyl)-2-hydroxyethyl]glutarimide, is a antibiotic that is produced by a culture of *Streptomyces griseus* on a suitable nutrient medium. The active component can be isolated from a fermentative beer by the methods described in United States Patents 2,574,519 and 2,612,502. It has been shown to be effective for the control of many plant diseases caused by fungi; e.g., it is effective in the control of cherry leaf spot, cereal grain rusts, bean anthracnose, apple scab, and various turf diseases such as Merion bluegrass rust.

It has now been found that the lower-alkylhydrazones of cycloheximide are superior to cycloheximide for the control of fungal diseases, because they can be applied to plants, e.g., to plant foliage, in higher concentrations than cycloheximide without causing injury to the plants. Moreover, these less phytotoxic compounds can be applied directly to seeds prior to planting and will protect the resultant seedlings from injuries due to soil-borne micro-organisms such as Fusarium species. It has also been found that the lower-alkylhydrazones of cycloheximide can be applied to foliage from where they are absorbed into the plant tissues and effectvely translocated as systemic fungicides to other parts of the plant. Thus, protection against fungal infection is afforded to untreated part of hte plant and to new growth.

For example, in a test involving the methylhydrazone of cycloheximide, excellent systemic control of cherry leaf spot (*Coccomyces hiemalis* Higgins) was obtained with a spray solution containing 25 parts per million of the chemical. In other tests, for both eradicative and protective control against leaf rust (*Puccinia rubigo-vera tritici*) and stem rust of wheat (*Puccinia graminis tritici*), the methylhydrazone has been found highly effective at concentrations of 25 to 50 parts per million. The compound was found to be surprisingly effective against bean anthracnose (*Colletotrichum lindemuthianum*). It has given about 95 percent control of apple scab (*Venturia inaequalis*) when applied at a concentration of 50 parts per million. No phytotoxicity was observed. Protection against fungal diseases of flowering plants such as petunias and snapdragons has also been obtained.

For these purposes, the compounds of the invention can be formulated with aqueous or non-aqueous carriers for application to foliage, seeds, or other parts of plants, and into compositions suitable for root or bole infusion. Aqueous preparations of any desired concentration can be conveniently prepared by dissolving the lower-alkylhydrazone in a water-miscible solvent such as dimethylformamide, dimethylacetamide, dimethyl sulfoxide, methanol, or ethanol; and admixing such solution with an appropriate quantity of water. In the case of sprays for application to cereal grains and grasses for prevention of rusts, it is advantageous to include in the final spray mixture a small amount (about 0.25–1.0 percent by volume) of a non-phytotoxic oil such as summer oil.

It is sometimes desirable, particularly in the case of foliar spray compositions, to include adjuvants such as wetting agents, spreading agents, dispersing agents, stickers and adhesives, and the like in accordance with usual agricultural practices. Anionic, cationic, and non-ionic surfactants can be used. Suitable surfactants include alkyl sulfates and sulfonates, alkylarylsulfonates, sulfosuccinate esters, polyoxyethylene sulfates, polyoxyethylene sorbitan monolaurate, alkylarylpolyether sulfates, alkylarylpolyether alcohols, alkyl quaternary ammonium salts, sulfated fatty acid esters, sulfated fatty acid amides, glycerol mannitan laurate, polyalkylether condensates of fatty acids, ligninsulfonates, and the like.

Generally, mixtures containing very low concentrations of the active ingredient are effective. Suitably, the concentration of a cycloheximide lower-alkylhydrazone in a liquid formulation can range from about 0.5 to about 100 parts per million, or even higher, such as up to the practical limits of maintaining a homogeneous dispersion of the components. For example, a concentrate comprising, on a weight basis, one percent cycloheximide lower-alkylhydrazone dissolved in a water-miscible solvent of the kind noted above can be admixed with an aqueous medium in the proportions of one teaspoonful (5 cc.) of concentrate and one gallon of medium to give a mixture containing thirteen to fourteen parts of active ingredients per million parts of water. One pint of a one percent concentrate mixed with 100 gallons of water provides about twelve parts per million of active ingredient. Similarly, more concentrated solutions of an active ingredient in a water-miscible solvent can be incorporated with an appropriate quantity of aqueous medium to give a preparation of desired concentration.

If desired, the active material can be compounded with a powder carrier. Thus the lower-alkylhydrazones of cycloheximide can be milled or otherwise admixed with inert solid carriers such as talc, pyrophyllite, Georgia clay, bentonite, or mixtures thereof, with or without adjuvants such as those mentioned above, to provide compositions which can be used for treating seeds, or for the dusting of plants, or for preparing aqueous sprays for application to foliage. A suitable formulation is obtained by milling and blending 434.5 pounds of Georgia clay, 4.5 pounds of Triton X–100 (an alkylarylpolyether alcohol) as a wetting agent, nine pounds of Daxad 27 (polymerized sodium salt of substituted benzoid long-chain alkyl sulfonic acid) as a dispersant, and about 5.5 pounds of lower-alkylhydrazone of cycloheximide. The resulting mixture has the following percentage (by weight) composition.

| | Percent |
|---|---|
| Lower-alkylhydrazone of cycloheximide | 1.2 |
| Triton X–100 | 1 |
| Daxad 27 | 2 |
| Georgia clay | 95.8 |

This formulation when added to water at one pound per hundred gallons gives a spray mixture containing about thirteen to fourteen parts per million of active ingredient, Little Marvel pea seeds were treated with a solid composition prepared by intimately admixing one part of cycloheximide methylhydrazone and 99 parts of pyrophyllite (parts by weight). The seeds were tumbled with 0.25 percent of their weight of this composition and were then planted in ordinary, i.e., non-sterile, soil. Untreated seeds were planted under the same conditions, as a control. Approximately 96 percent of the treated seeds produced seedlings as compared to approximately 76 percent in the case of the untreated seeds. After three weeks the seedings were harvested, and the root and foliage weights were promptly determined before drying could occur. The average weights per plant were:

|  | Root, grams | Foliage, grams |
| --- | --- | --- |
| Seedlings from treated seeds | 1.49 | 2.1 |
| Seedlings from untreated seeds | 0.77 | 1.6 |

While the compounds of the invention are particularly useful as plant disease fungicides and have been more particularly described above in connection therewith, they are likewise useful generally in controlling fungi which commonly infest and attack plant and animal matter either in its natural or fabricated state, e.g., rawhide, glue, gelatin, leather, cork, wood, cotton fabric, cordage, ink, casein products, etc.

The compounds of the invention have also been demonstrated to possess insecticidal properties as well as activity against other pest organisms. For example, the methylhydrazone and dimethylhydrazone of cycloheximide caused 67 and 78 percent mortality, respectively, in test populations of thrips when applied by conventional procedure at a concentration of one-tenth of one percent.

The lower-alkylhydrazones of the invention are prepared according to the well-known reaction of a hydrazine with a carbonyl compound under slightly acidic conditions. For example, an acidic solution of a lower-alkylhydrazine having the formula:

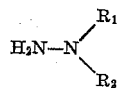

wherein $R_1$ is lower-alkyl and $R_2$ is selected from the group consisting of hydrogen and lower-alkyl, is mixed with an alcoholic solution of cycloheximide. After allowing the reaction to become substantially complete, the volatile components of the mixture are removed by distillation and the residue is extracted with a solvent such as methylene chloride, carbon tetrachloride, chloroform, benzene, ethyl acetate, and the like. The extracts are washed with water, dried, and the solvent is removed by distillation in order to isolate the cycloheximide lower-alkylhydrazone.

Some examples of hydrazines which form the compounds of the invention are: methylhydrazine, N,N-dimethylhydrazine, ethylhydrazine, N,N-diethylhydrazine, N-ethyl-N-methylhydrazine, isopropylhydrazine, isobutylhydrazine, n-butylhydrazine, and the like.

The following examples are illustrative of the process and products of the present invention, but are not to be construed as limiting.

EXAMPLE 1

Preparation of cycloheximide methylhydrazone

A solution containing 23.04 grams (0.5 mole) of methylhydrazine in thirty milliliters (0.5 mole) of glacial acetic acid and 200 milliliters of water was added to a solution containing 28.14 grams (0.1 mole) of cycloheximide in 200 milliliters of methanol. The reaction mixture was permitted to stand overnight. The volatile components were then removed by distillation under reduced pressure. The residue was extracted four times with 100-milliliter portions of methylene chloride; the combined extracts were washed with two 50-milliliter portions of water. The solution was dried over anhydrous sodium sulfate; then the methylene chloride extract was filtered, and the solvent was removed by distillation. The residue foamed and partially solidified when the pressure was reduced. The solids were crushed and triturated with technical hexane (essentially a mixture of methyl-substituted pentanes and n-hexane having a boiling range of 140–160 degrees Fahrenheit), cycloheximide methylhydrazone being thus obtained in amorphous condition.

EXAMPLE 2

Preparation of cycloheximide methylhydrazone

A solution of 4.0 kilograms of technical grade cycloheximide in 28.5 liters of methanol and a solution of 3.27 kilograms of methylhydrazine in 4.27 liters of glacial acetic acid were mixed. The resulting reaction mixture was allowed to stand at room temperature for sixty hours, and was then concentrated under reduced pressure to a volume of five liters. To this concentrate was added 14.5 liters of water, and the mixture was extracted with four portions (three liters each) of methylene chloride. The combined extracts were washed with three portions (eight liters each) of water, dried with anhydrous sodium sulfate, and evaporated. The residual, thick, pale yellow oil was subjected to high vacuum (pressure about 0.1 millimeter of mercury). Cycloheximide methylhydrazone was thus obtained as a puffy, expanded solid weighing 3.24 kilograms. The specific rotation, $[\alpha]_D$, was plus 53 degrees (c., one percent in dimethyl sulfoxide). A sample was freeze-dried for analysis.

Analysis.—Calc'd for $C_{16}H_{27}N_3O_3$: C, 62.11; H, 8.80. Found: C, 61.54; H, 8.63.

EXAMPLE 3

Preparation of cycloheximide dimethylhydrazone

A solution containing 30.05 grams (0.50 mole) of N,N-dimethylhydrazine in thirty milliliters of glacial acetic acid and 200 milliliters of water was added to a solution containing 28.14 grams (0.1 mole) of cycloheximide in 200 milliliters of methanol. The reaction mixture was permitted to stand overnight. The volatile components were then removed by distillation under reduced pressure. The residue was extracted four times with 100-milliliter portions of methylene chloride, and the combined extracts were washed with two 50-milliliter portions of water. The solution was dried over anhydrous sodium sulfate; then the methylene chloride extract was filtered and the solvent was removed by distillation. Cycloheximide dimethylhydrazone was thus obtained as an oil which foamed and partially solidified under reduced pressure.

EXAMPLE 4

Preparation of cycloheximide ethylhydrazone

Following the procedure of Example 1, but substituting for methylhydrazine an equivalent amount of ethylhydrazine, cycloheximide ethylhydrazone was prepared.

EXAMPLE 5

Preparation of cycloheximide diethylhydrazone

Following the procedure of Example 1, but substituting for methylhydrazine an equivalent amount of N,N-diethylhydrazine, cycloheximide diethylhydrazone was prepared.

EXAMPLE 6

Preparation of cycloheximide isopropylhydrazone

Following the procedure of Example 1, but substituting for methylhydrazine an equivalent amount of isopropylhydrazine, cycloheximide isopropylhydrazone was prepared.

Example 7

Preparation of cycloheximide isobutylhydrazone

Following the procedure of Example 1, but substituting for methylhydrazine an equivalent amount of isobutylhydrazine, cycloheximide isobutylhydrazone was prepared.

It is to be understood that the invention is not to be limited to the exact details of operation or exact compounds shown and described, as obvious modifications and equivalents will be apparent to one skilled in the art, and the invention is therefore to be limited only by the scope of the appended claims.

I claim:
1. Lower-alkylhydrazone of cycloheximide.
2. Di-lower-alkylhydrazone of cycloheximide.
3. The dimethylhydrazone of cycloheximide.
4. Mono-lower-alkylhydrazone of cycloheximide.
5. The monomethylhydrazone of cycloheximide.
6. A method for the control of fungal organisms which comprises contacting said organisms with lower-alkylhydrazone of cycloheximide.
7. A method of protecting plants from damage caused by fungal disease which comprises applying to said plants lower-alkylhydrazone of cycloheximide.
8. The method of claim 7 wherein lower-alkylhydrazone of cycloheximide is applied to seeds prior to planting.
9. A method of protecting plants from damage caused by fungal disease which comprises applying to the foliage of said plants an aqueous spray containing lower-alkylhydrazone of cycloheximide.
10. A composition for the control of fungal organisms which comprises as an essential active ingredient lower-alkylhydrazone of cycloheximide, carrier therefore, selected from the group consisting of a powder carrier and an aqueous carrier contain a surfactant.
11. A composition for the control of fungal organisms which comprises lower-alkylhydrazone of cycloheximide dissolved in a water-miscible solvent.
12. A composition for the control of fungal organisms which comprises lower-alkylhydrazone of cycloheximide dissolved in dimethylformamide.
13. A composition for the control of fungal organisms which comprises lower-alkylhydrazone of cycloheximide and an inert powder carrier.
14. A process for preparing lower-alkylhydrazone of cycloheximide which comprises mixing an acidic solution of lower-alkylhydrazine with an alcoholic solution of cycloheximide and recovering the lower-alkylhydrazone of cycloheximide thus formed.

References Cited in the file of this patent

Kornfeld et al.: Jour. Am. Chem. Soc., vol. 71, pp. 150–159 (January 1949).

Karrer: Organic Chem, second ed., 1946, Elsevier Publ. Co. Inc., New York, pp. 164–166, 153.

Shriner et al.: The Systematic Identification of Organic compounds, 3rd ed., 1948, John Wiley and Sons, New York, pp. 167, 171, and 201.

Henry et al.: Science, vol. 115, pp. 90–91 (January 1952).

Gottlieb et al.; Phytopathology, vol. 42, pp. 493–496 (1952).

UNITED STATES PATENT OFFICE
CERTIFICATE OF CORRECTION

Patent No. 2,894,871                                              July 14, 1959

Maxton F. Murray

It is hereby certified that error appears in the printed specification of the above numbered patent requiring correction and that the said Letters Patent should read as corrected below.

Column 1, line 24, left-hand portion of the formula, for "$CH_3C<$" read read -- $CH_3CH$ --; column 6, line 5, for "contain" read -- containing --.

Signed and sealed this 5th day of January 1960.

(SEAL)
Attest:
KARL H. AXLINE                                              ROBERT C. WATSON
Attesting Officer                                          Commissioner of Patents